United States Patent
Ho et al.

[11] Patent Number: 5,907,422
[45] Date of Patent: *May 25, 1999

[54] UNIVERSAL OPTICAL SIGNAL RECEIVER

[75] Inventors: Ching Ho; Yue-Syan Jou, both of San Jose; Chun-Meng Su, Moraga; Peter Wang, Sunnyvale; Yong Cheng Tu, Santa Clara, all of Calif.

[73] Assignee: Qualop Systems Corp., Santa Clara, Calif.

[ * ] Notice: This patent is subject to a terminal disclaimer.

[21] Appl. No.: 08/779,204

[22] Filed: Jan. 6, 1997

Related U.S. Application Data

[63] Continuation-in-part of application No. 08/430,893, Apr. 27, 1995.

[51] Int. Cl.[6] ................................................. H04B 10/06
[52] U.S. Cl. ..................... 359/189; 359/194; 250/214 A
[58] Field of Search ................................ 359/161, 189, 359/194; 250/214 A; 330/59, 308

[56] References Cited

U.S. PATENT DOCUMENTS

| | | | |
|---|---|---|---|
| 5,347,389 | 9/1994 | Skrobko | 359/189 |
| 5,477,370 | 12/1995 | Little et al. | 359/189 |
| 5,745,276 | 4/1998 | Ho et al. | 359/189 |

*Primary Examiner*—Kinfe-Michael Negash
*Attorney, Agent, or Firm*—Robert P. Sabath

[57] ABSTRACT

An optical receiver communication system converts optical signals modulated by analog or digital waveforms to RF signals. The optical receiver contains an automatic level control circuit to adjust the electronic gain of the system across a broad bandwidth spectrum. Two impedance matching circuits are designed using broad band matching technique to expand the bandwidth for increasing the maximum receivable frequencies to 1 GHz. A RLC impedance matching circuit forms a resonant combination to maintain ±1 dB fluctuation between the low-and-high-frequency limits of the bandwidth, and a 75Ω impedance matching circuit creates a 180° phase shift between outgoing and incoming signals to ensure low return loss.

20 Claims, 11 Drawing Sheets

UNIVERSAL OPTICAL SIGNAL RECEIVER

CROSS-REFERENCE TO RELATED APPLICATION

This is a continuation-in-part application based upon an earlier patent application entitled "Universal Optical Signal Receiver" and filed at the U.S. Patent and Trademark Office on Apr. 27, 1995 as Application Ser. No. 08/430,893 by Peter Wang et al. as inventors. This earlier patent application is incorporated herein in its entirety and priority is claimed therefrom as of its filing date.

FIELD OF THE INVENTION

The present invention relates to optical fiber communication systems and methods, and more particularly to optical receivers which convert optical signals received into analog or digital radio frequency (RF) signal form.

BACKGROUND OF THE INVENTION

An increasing information traffic load flows on today's information superhighways. This has made fiber optic communication systems increasingly important for local and long distance video, voice, and data transmission of information. Information in optical cables is carried within a broad bandwidth spectrum of frequencies. As more information is carried on coaxial or optical cables, signal capacity throughout the broad bandwidth spectrum has become increasingly crowded and subject to congestion.

Typical fiber optical communication systems include a transmitter, a receiver, and a fiber optic cable line between the receiver and the transmitter. The transmitter of the optical communication system converts received RF signals into corresponding modulated light signals which carry information to its intended receiver through the fiber optic cable line. The receiver converts the light signals back into RF form.

Conventional optical receivers rely on impedance matching circuits which match impedance within a narrow frequency range available for cable television (CATV) channels between 50 and 550 MHz. These optical receiver systems restrict information transfer to the lower portion of the indicated frequency range. Current receivers are further limited in input power range and are susceptible to output RF signal instability. At the receiver output, surge protectors and bias tees implemented with a combination of parasitic capacitance and inductance are commonly provided. The combination of these two components results in poor return loss performance.

Accordingly, there is a need to provide an optical receiver with broader bandwidth capability to facilitate handling of greater amounts of information.

SUMMARY OF THE INVENTION

The present invention includes an optical receiver system that converts an analog or digital optical signal to an output RF electrical signal. The optical receiver system according to the present invention includes optical detector amplifiers, impedance matching circuits, and an automatic level control (ALC) circuit, to convert optical signals into electrical signals, to condition the converted electric signals, and to enable a signal receiving rate of the optical receiver up to on the order of 1 GHz.

According to the present invention, two impedance matching circuits match circuit impedances to enable the frequency domain of the output electrical signal to achieve a desired flatness of frequency response and to maximize return loss. One of the impedance matching circuits is coupled to the output side of the optical receiver and includes a 75Ω transmission line to maximize return loss. The second impedance matching circuit is implemented in a resistor-inductor-capacitor (RLC) configuration and is placed inside the optical receiver to form a resonant circuit that achieves a highly flattened response characteristic.

An automatic level control circuit (ALC), according to the present invention, includes a feedback loop to adjust the gain of the electronic signal as it propagates through the receiver system. Monitoring of the signal at amplifier output automatically to adjust the attenuation of the ALC circuit permits maintaining the stability of the output RF signal of the receiver system.

The optical receiver according to the present invention facilitates signal conversion for each of two well-known wavelength windows in fiber optic communications systems, i.e., the second and third windows. The second window is found at an optical wavelength of approximately 1310 nm. The optical attenuation in the range of these frequencies is on the order of about 0.4 dB per kilometer. These frequency bands are commonly used for local cable TV signal distribution. The third window is an optical wavelength band at on the order of 1550 nm. Optical attenuation for frequencies in this window is about 0.25 dB per kilometer, which is well suited for the long distance transmission of cable TV signals. According to one embodiment of the present invention, an erbium doped optical fiber amplifier (EDFA) is used directly to amplify optical CATV signal. This direct amplification of optical signal makes the cable TV transmission over long distances practicable and cost effective.

DETAILED DESCRIPTION OF THE PREFERRED EMBODIMENT

Figure 1:
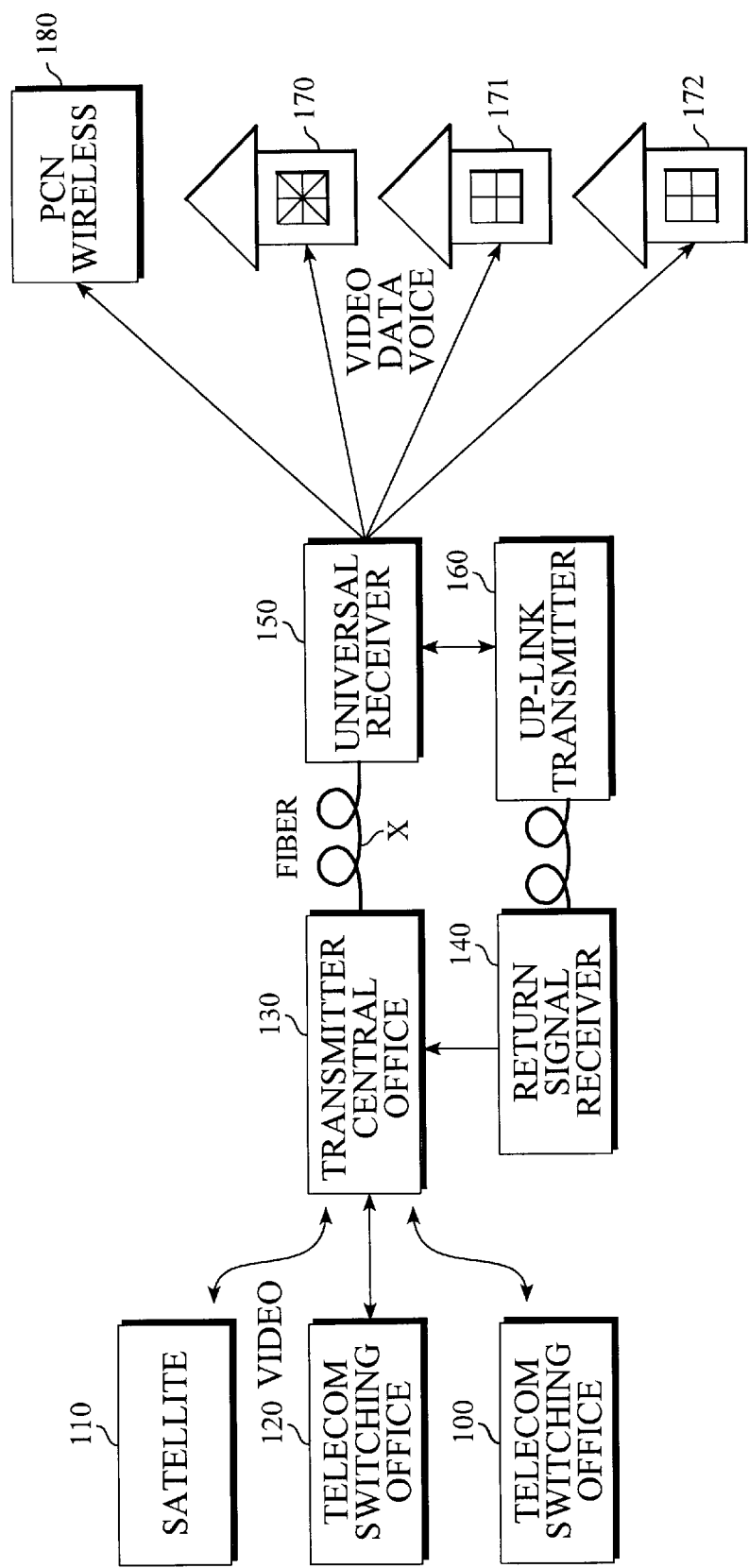
FIG. 1 shows a general block diagram of a fiber optic communication system of the present invention.

FIG. 1 shows a fiber optic communication system according to the present invention for transmitting and receiving information including video, voice, and data signals. A transmitter 130 at a CATV headed collects electrical signals from several sources, including for example a satellite 110, a telcom switching office 120, and a microwave link 100; and transmits optical signals via fiber cables x to an optical receiver 150. The optical receiver 150, which is generally remote to the transmitter 130, converts received optical signals into corresponding electrical signals for distribution at selected destinations, such as government agencies, offices, or homes. Optical receiver 150 includes an up-link transmitter (return path) 160 to send a signal from a receiver site back to transmitter 130 at a cable TV headed through return signal receiver 140, which enables interactive communication between the cable TV headed and various destinations, such as homes 170, 171, and 172.

Figure 2:
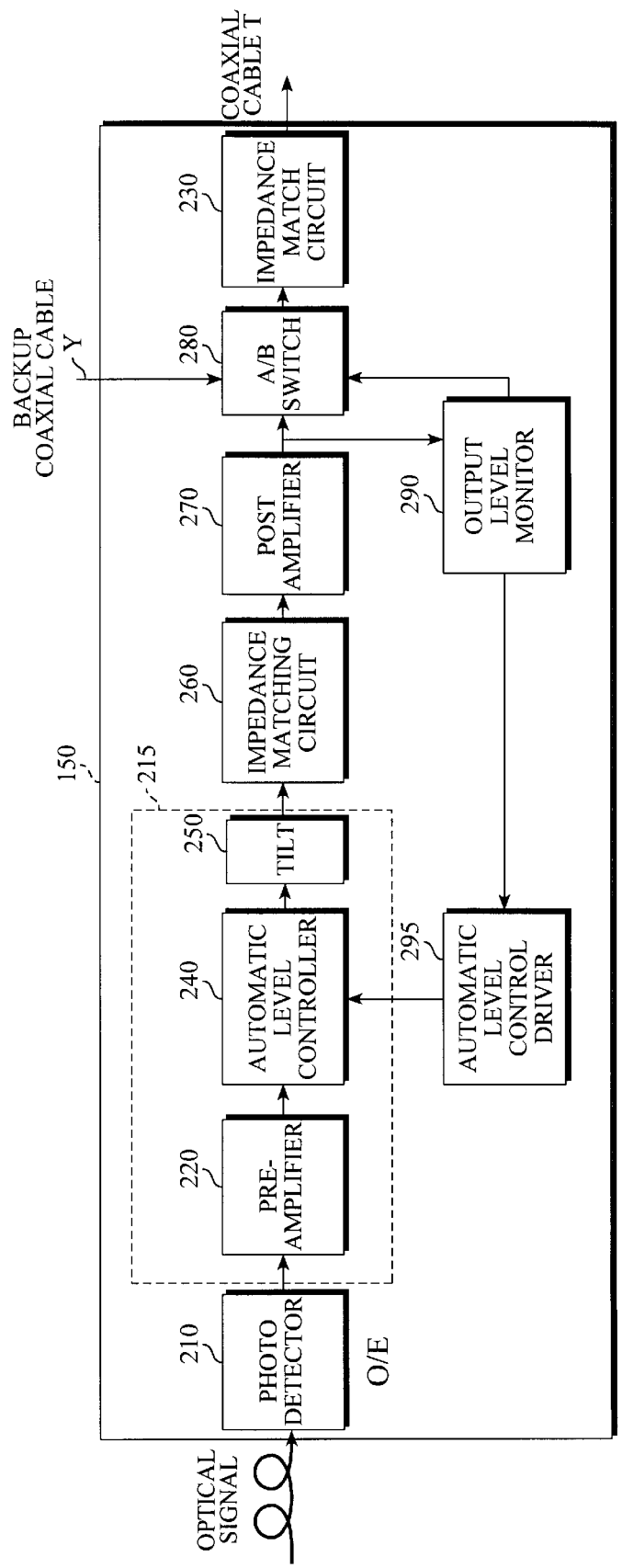
FIG. 2 illustrates a block diagram of an optical receiver in accordance with the present invention.

FIG. 2 is a block diagram of the optical receiver 150 in accordance with the present invention. Photo detector 210 receives an optical signal and converts it into an electrical signal. Signal processing circuit 215 includes a pre-amplifier 220, an automatic level controller (ALC) 240, and a tilt circuit 250, for conditioning electrical signals from photo detector 210, and for transmitting a corresponding electrical signal to an impedance matching circuit 230. Pre-amplifier 220 increases the signal level of received electrical signals, which are generally too weak in amplitude for further transmission in the following coaxial system or for distribution to subscribers. In order to accommodate different link loss budgets due to transmission distances, varying cable qualities, variations in connectors, and the effects of temperature fluctuations and environmental changes, an ALC 240 circuit is coupled to the output of pre-amplifier 220, as an automatic tuning attenuator to maintain the stability of output signals of receiver 150. The attenuation of ALC 240 follows a feedback signal at the output of the post amplifier 270. Tilt circuit 250 adjusts the tilt (amplitude as a function of frequency) of the signal output from optical receiver 150 to compensate for relatively higher signal losses at high frequencies on a following coaxial cable. Two impedance matching circuits 230 and 260 are implemented in optical receiver 150, to increase broad band frequency response to on the order of 1 GHz. Impedance matching circuit 230 matches the impedance as a function of frequency of electrical signals, by using a resistor-inductor-capacitor (RLC) combination to adjust the amplitude of the low frequency spectrum, achieving frequency response flatness on the order of ±1 dB. Impedance matching circuit 260 includes a 75Ω transmission line, for example. A post-amplifier 270, similar to pre-amplifier 220, is connected after impedance matching circuit 230 to boost the amplitude of the output electrical signal. An A/B switch 280 provides optional multiplexing for selecting between a received electrical signal propagated through photo detector 210 and a bypass photo detector 210 with a direct connection to the A/B switch from a coaxial cable input Y. The electrical signal at the output of the A/B switch 280 is supplied to impedance matching circuit 260 to match received electrical signals to achieve maximum return loss performance, by absorbing reflected signals from distorting noise into optical receiver 150. An output level monitor 290 is coupled between the output of a post-amplifier 270 and the input of an ALC driver 295 to increase or to decrease the amplitude of electrical signals depending on whether the output signal level is below or above a predetermined selected signal level. Output level monitor 290 is further used to control the switch 280. If the output signal from post amplifier 270 is above a predetermined signal level, an output signal is received from the post amplifier 270. However, if the output signal from post amplifier 270 falls below a predetermined signal level, which indicates that optical receiver 150 is not operable, then optional A/B switch 280 connects to backup coaxial cable Y to receive alternative signal inputs and thus bypasses the optical input of the optical detector 210. The overall performance of optical receiver 150 of FIG. 2 is dictated primarily by flatness, optical return loss, and optical dynamic range parameters. Frequency response flatness is determined by resistor 530, capacitor 520, and inductance 510 in impedance matching circuit 230 of FIG. 5A. The numerical values of flatness and return loss parameters depend substantially on the maximum frequency response allowed by impedance matching circuits 260 and 230, respectively. A third parameter, optical dynamic range, serves as a limiting factor on input power level to optical receiver 150. At one end of the optical power range, high input optical power can overload the receiver circuitry, resulting in large distortions of the resultant output RF signal. At the other end of the optical power range, low optical input power produces a low signal level that reduces the signal-to-noise ratio.

Figure 3:
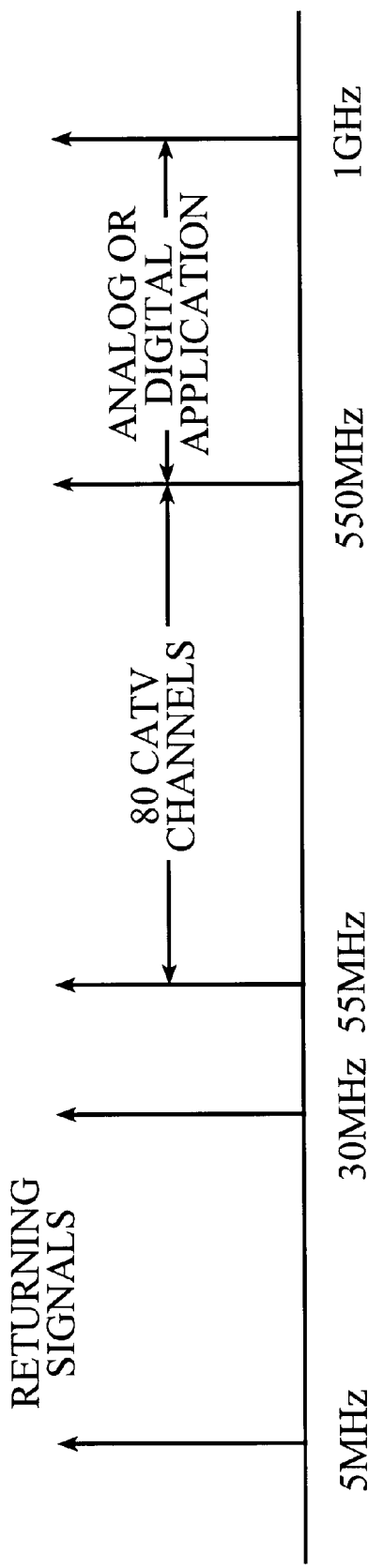
FIG. 3 shows a bandwidth spectrum for various optical fiber applications according to the present invention.

FIG. 3 shows signal bandwidth for selected communication applications over a particular portion of the frequency spectrum. Analog cable television channels occupy the bandwidth between 55 MHz and 550 MHz. Optical receiver 150 according to the present invention provides an information output at the upper end of a frequency range from about 550 MHz to 1 GHz to allow receipt of optical signals in analog or digital formats. The bandwidth from 5 MHz to 30 MHz is reserved as a return signal path.

Figure 4A:
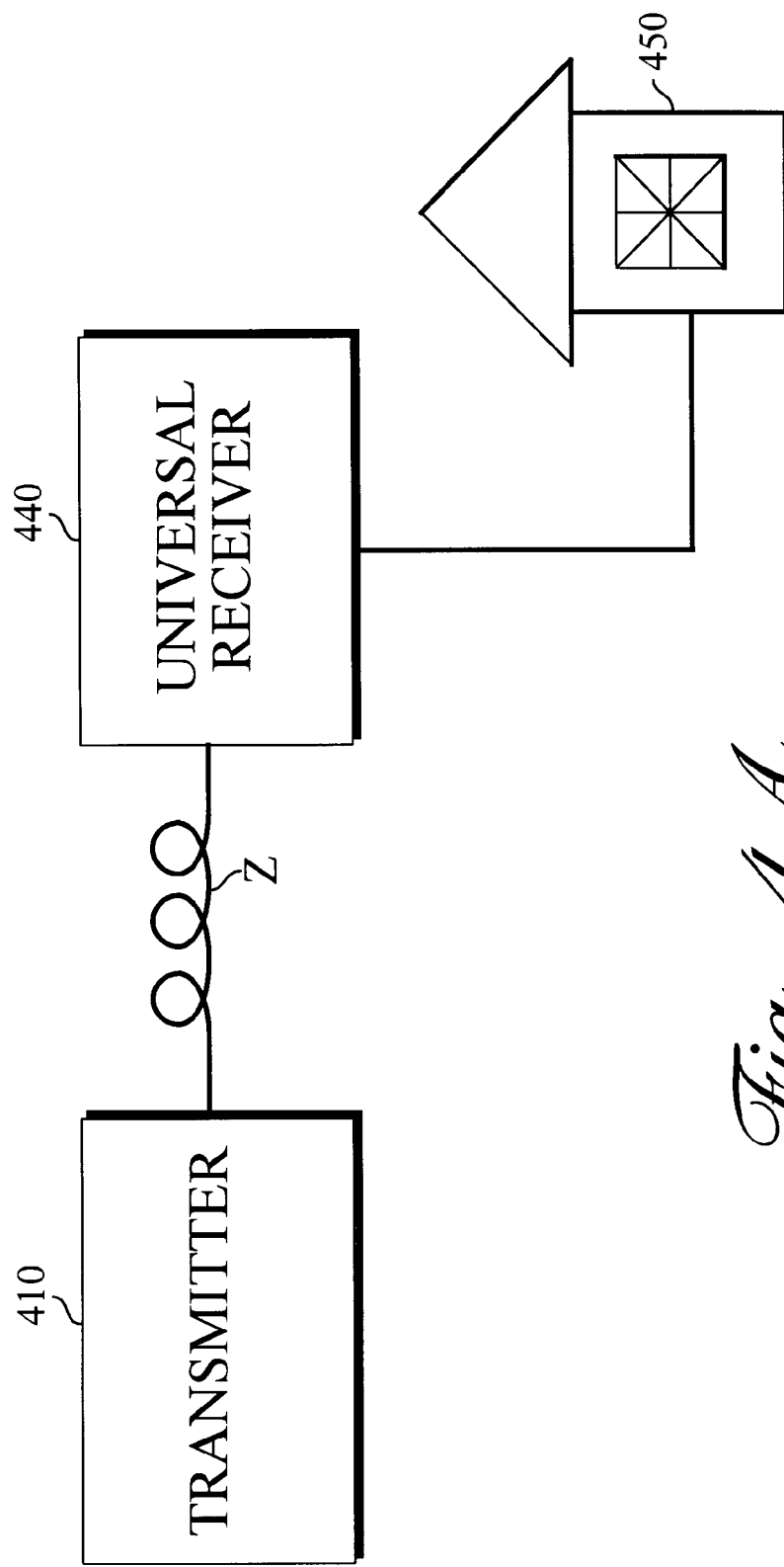
FIG. 4A is a block diagram of an optical Cable TV transport system, according to the present invention, in a 1310 nm system.
Figure 4B:
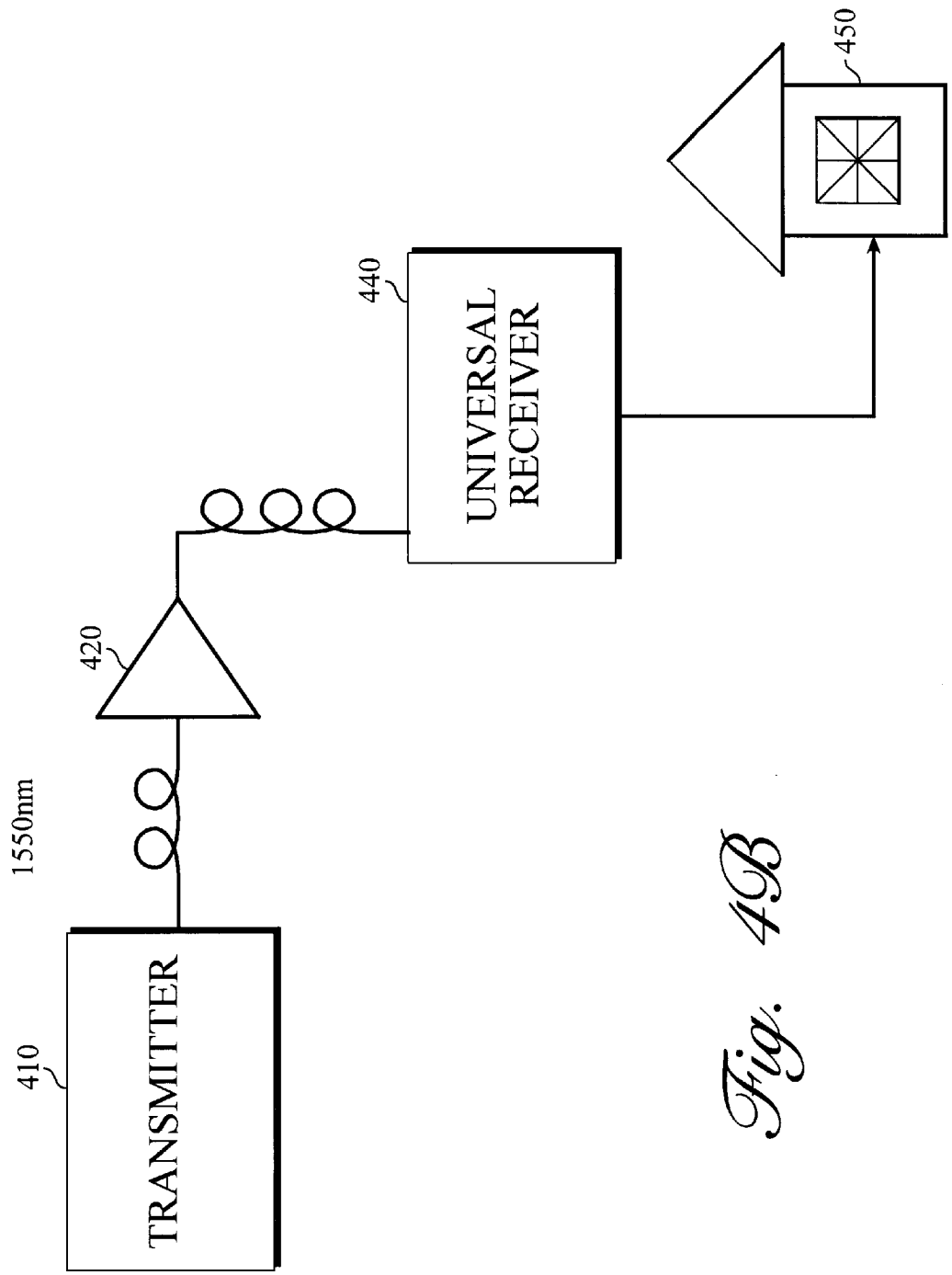
FIG. 4B is a block diagram of an optical Cable TV transport system, according to the present invention, in a 1550 nm system.

FIGS. 4A and 4B show alternative applications of optical receiver 150 according to the present invention, used to receive light signals in communication systems operating at wavelengths of 1310 nm and 1550 nm, for example. In optical fiber communication systems, voice, data and video signals may be converted to light signals and transmitted with different optical fiber attenuation rates at light wavelengths of 1310 nm or 1550 nm. Typically, 1310 nm light signals are used for local distribution, and 1550 nm light signals are chosen for long distance communication due to lower attenuation at 1550 nm. In FIG. 4A, a transmitter 410 sends optical signals onto a fiber optic cable Z to optical receiver 440. Receiver 440 converts optical signals into electrical signals and amplifies the resultant electrical signals for distribution. FIG. 4A shows a preferred application for light signals at 1310 nm wavelength signal transmission as far as 30 km. For longer distance signal transmission, i.e., transmission further than 30 km as illustrated in FIG. 4B with optical amplifier 420 may increase the amplitude of the transmitted optical signal so that subsequent universal receiver 440 may be placed a longer distance from the transmitter. A preferred operating wavelength is 1550 nm. Universal receiver 440, according to one embodiment of the present invention, is an optical receiver operable at dual wavelengths of 1310 nm and 1550 nm.

Figure 5A:
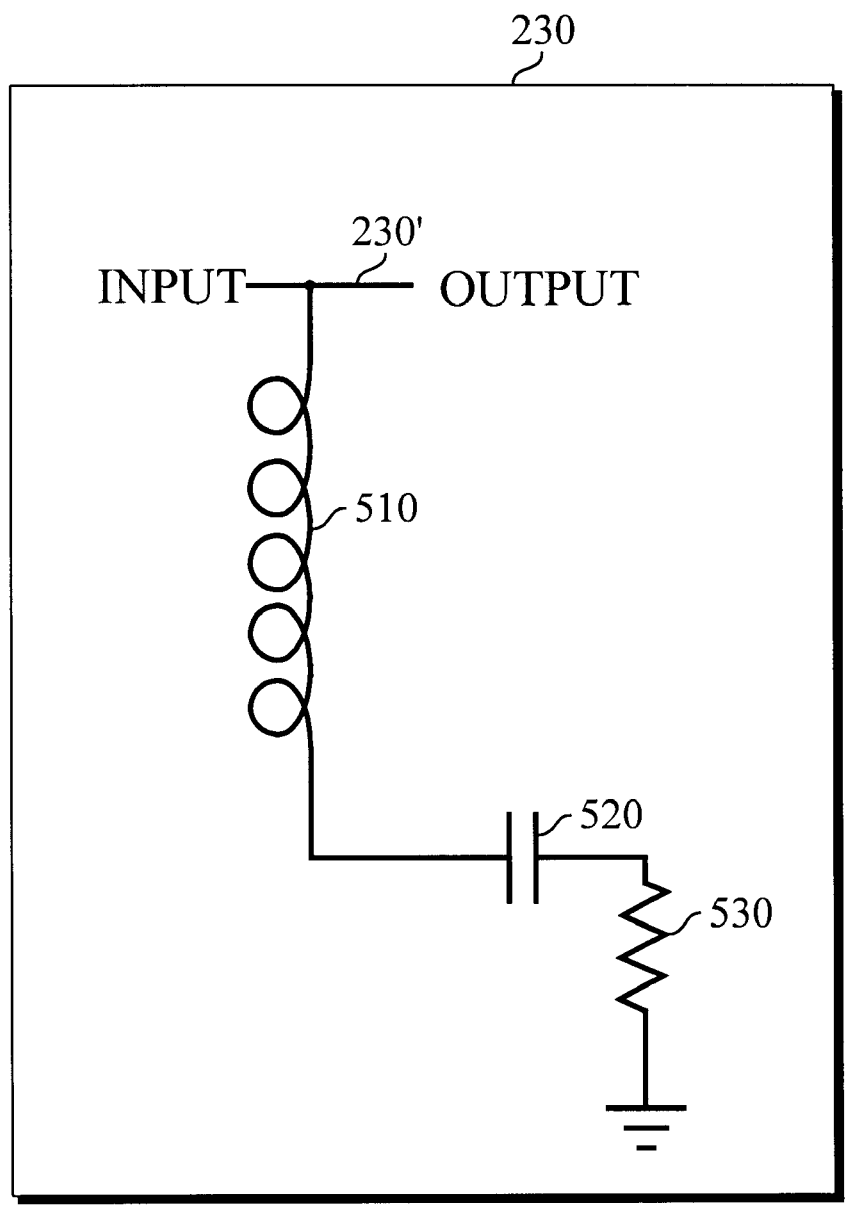
FIG. 5A is a schematic circuit diagram of an impedance matching circuit in RLC configuration, according to the present invention.

FIG. 5A shows an embodiment of an impedance matching circuit 230 according to the present invention, including a series RLC circuit including an input node 230'; and in series an inductor 510, a capacitor 520, and a resistor 530. The Resistor 530 is connected to ground. The RLC resonates at about 3rd MHz to improve circuit signal amplitude deviation at low frequency by suppressing low frequency signals while maintaining high frequency response to keep signal deviation within an acceptable 2 dB fluctuation range. Otherwise, if the signal amplitude deviation were to exceed a 2 dB variation level, then low signal level channels would have a low carrier-to-noise ratio which might produce a snowy picture on a display screen.

Figure 5B:
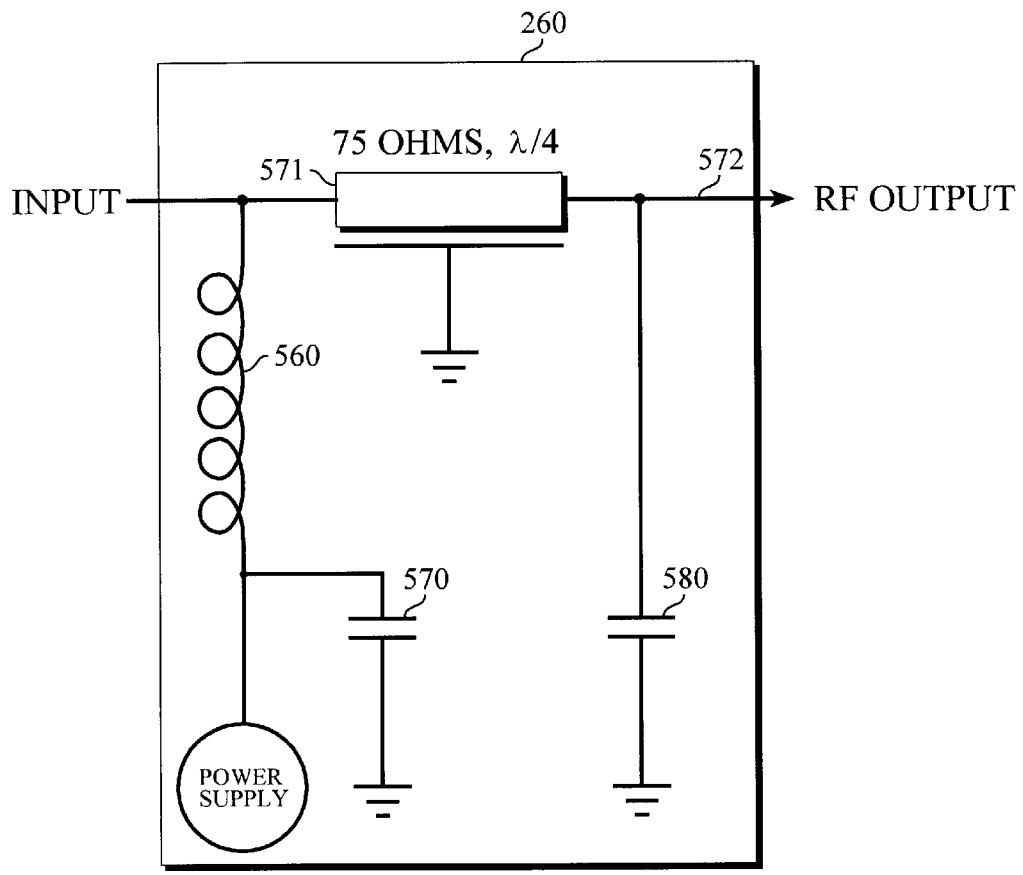
FIG. 5B shows a schematic circuit of an impedance matching circuit including a 75Ω transmission line, according to the present invention.

FIG. 5B shows an embodiment of an impedance matching circuit 260 according to the present invention for reducing the signal return to receiver 150 and minimizing interference induced noise in the optical receiver. As is well-known, the quality of impedance matching is typically determined by return loss. The higher the return loss, the less the return signal will be, producing reduced signal interference. Impedance matching circuit 260 includes a 75Ω quarter wave coaxial transmission line 571, an inductor 560, and capacitors 570 and 580, which combine to produce a system impedance of approximately 75Ω and to achieve an enhanced level of return loss (e.g., better than 16 dB). The length of transmission line 571 is set to one quarter wavelength for a 750 MHz signal, for example. The 750 MHz signal traveling round trip in the coax changes phase 180 degrees. For a return signal for impedance matching circuit 260, small capacitance capacitor 580 and large inductor 560 are open to low frequency signals. Impedance matching circuit 260 acts as a transmission line and makes substantially no change to the transmission at low frequency. When the signal frequency is high, inductor 560 is subject to a parasitic capacitance. The parasitic capacitance transforms into inductance due to a phase change of 180 degrees at transmission line 571. The parasitic inductance and capacitor 580 further form a resonance circuit, absorbing return signal at around 900 MHz as shown in FIG. 7C. The net effect is to improve the overall return losses for a frequency range of interest by 16 dB or more.

According to one embodiment of the present invention, impedance matching circuit 260 transmits radio frequency signals in a selected frequency range f1 to f2. Impedance matching circuit 260 includes a quarter wave transmission line 51 operating at a selected frequency near f2, and has first and second sides. Impedance matching circuit 260 further includes an inductor 570 having an inductance and a parasitic capacitance, connected to the first side of transmission line 51. The inductance of inductor 570 is sufficiently high to prevent substantial leakage to ground. Impedance matching circuit 260 further includes a capacitor 580 having a selected capacitance "c", which is connected to the second side of transmission line 51. The selected capacitance is sufficiently low to prevent substantial leakage to ground.

According to one embodiment of the present invention, the capacitance "c" of capacitor 580 equals $1/L (2\Pi f3)^2$, where c is a selected capacitance of capacitor C;

f3 is a resonant frequency greater than f2;

f2 is a frequency greater than f1; and

L is an effective inductance determined by the effect of the parasitic capacitance of inductor 570 acting through quarter wave transmission line 51.

Figure 6:
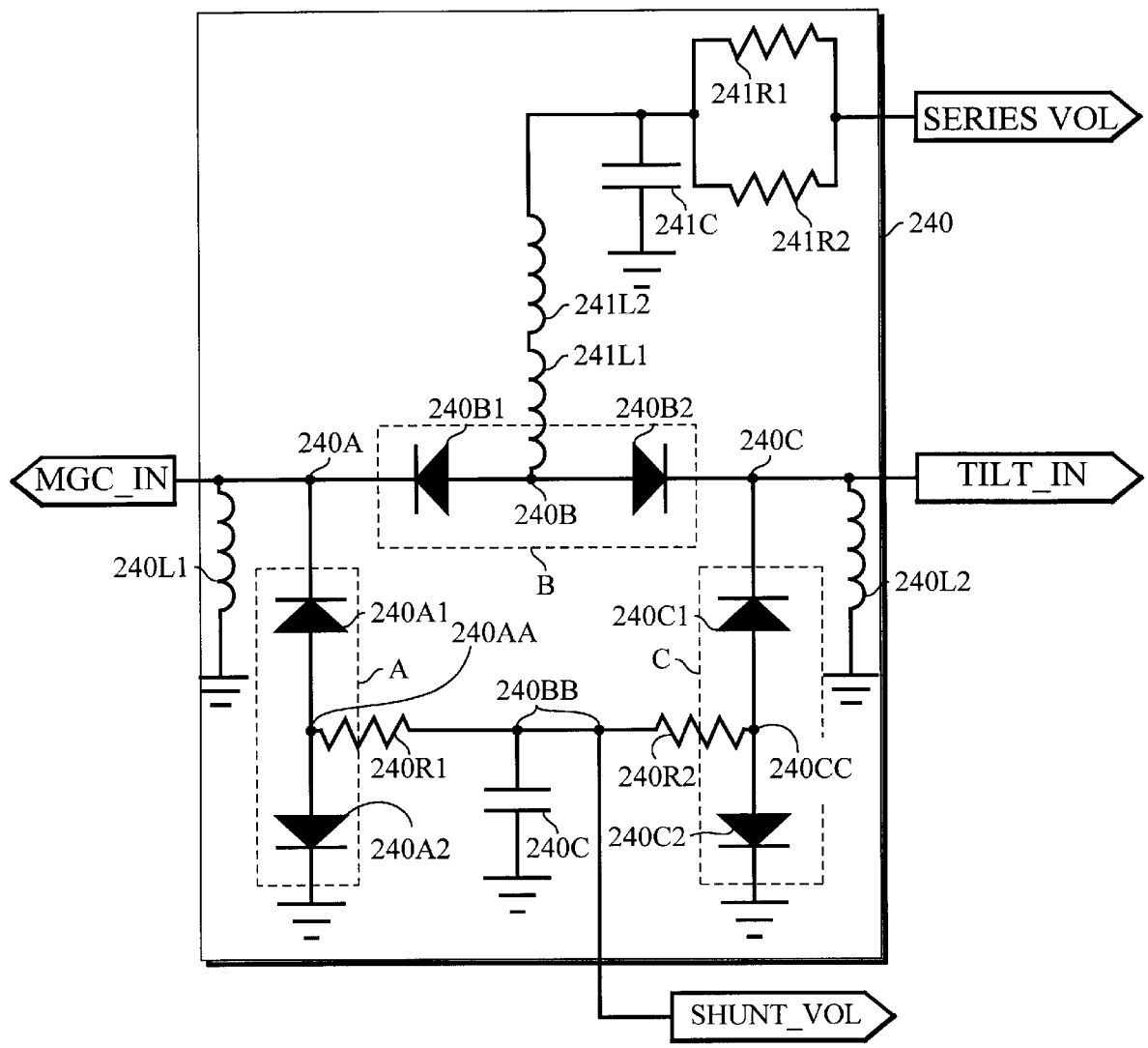
FIG. 6 is a schematic circuit of an automatic level control circuit, according to the present invention.

FIG. 6 is a schematic diagram of an automatic level control (ALC) circuit 240, according to the present invention, acting as a pai attenuator having a 75Ω impedance level, for example. ALC circuit 240 includes back-to-back diode pairs A, B, C, which form a pi circuit. Diode pair A includes first and second diodes 240a1 and 240a2; diode pair B includes first and second diodes 240b1 and 240b2; and diode pair C includes first and second diodes 240L1 and 240l2. ALC circuit further includes circuit nodes 240A, 240B, 240C, 240AA, 240BB, 240CC; inductors 240l1, 240l2, 24111, 24112; capacitors 240c, 241c; and current limiting resistors 240r1 and 240r2. First and second diodes 240a1 and 240a2 are connected to each other at node 240AA. First and second diodes 240b1 and 240b2 are connected to each other at node 240B. First and second diodes 240L1 and 240L2 are connected to each other at node 240CC. Diode pair A is connected to diode pair B at node 240A. Diode pair B is connected to diode pair C at node 240C. The resistance of each diode pair varies with the currents going through the respective diodes of the applicable pair. SHUNT_VOL is a bias voltage used to control current through diode pairs A and C. SERIES_VOL is a bias voltage used to control current through diode pair B. Diode pairs A and C are preferably balanced so that the power from SHUNT_VOL is distributed substantially equally through pairs A and C. Similarly, resistors 240L1 and 240L2 are substantially equal in resistance, permitting the equal distribution of power through diode pairs A and B. The voltage levels of SHUNT_VOL and SERIES_VOL are determined by automatic level control driver 295 shown in FIG. 2. The output signal level at TILT_IN from ALC circuit 240 depends upon the resistances of diode pairs A and C and the resistance of diode pair B, which respectively form the legs and body of the pi circuit of ALC circuit 240. Output signal level is a function of the resistances of the diode pairs which in turn is a function of the voltages SERIES_VOL and SHUNT_VOL. Inductors 240L1 and 24L2 are used to pass DC bias currents, while blocking RF signals from leaking to ground. Capacitors 240C and 241C, respectively, protect bias voltage sources SHUNT_VOL and SERIES_VOL from high frequency signals, as they serve as high frequency and RF sinks. Resistors 240K1, 240K2, 241K1 and 241r2 are current limiting resistors for respective bias voltage sources $SHUNT_{13}$ VOL and SERIES VOL. For attenuation up to 20 dB at 75Ω impedance, the combined respective resistances for diode pairs A, B, and C are listed in Table 1, where ATTN, Z, Ra, Rb, and Rc are attenuation, impedance, and the resistances for respective diode pairs A, B, C of ALC circuit 240. Table 1 follows below:

TABLE 1

The Resistance for Diode Pairs A, B, and C of the Pi Pad with 75 Ohm Impedance

| ATTN (dB) | Z (ohm) | Rb (ohm) | Ra, Rc (ohm) |
|---|---|---|---|
| 1 | 75 | 1305.0 | 8.7 |
| 2 | 75 | 654.3 | 17.4 |
| 3 | 75 | 438.6 | 26.4 |
| 4 | 75 | 331.5 | 35.8 |
| 5 | 75 | 267.8 | 45.6 |
| 6 | 75 | 225.8 | 56.0 |
| 7 | 75 | 196.1 | 67.2 |
| 8 | 75 | 174.2 | 79.3 |
| 9 | 75 | 157.5 | 92.4 |
| 10 | 75 | 144.4 | 106.7 |
| 12 | 75 | 125.3 | 138.4 |
| 14 | 75 | 112.4 | 180.5 |
| 16 | 75 | 103.2 | 230.7 |
| 18 | 75 | 96.6 | 293.1 |
| 20 | 75 | 91.7 | 371.3 |

SHUNT_VOL and SERIES_VOL are derived from RF level power to automatically maintain a selected RF output level notwithstanding fluctuations of input optical power and changes in operating temperature for optical receiver 150.

Figure 7A:
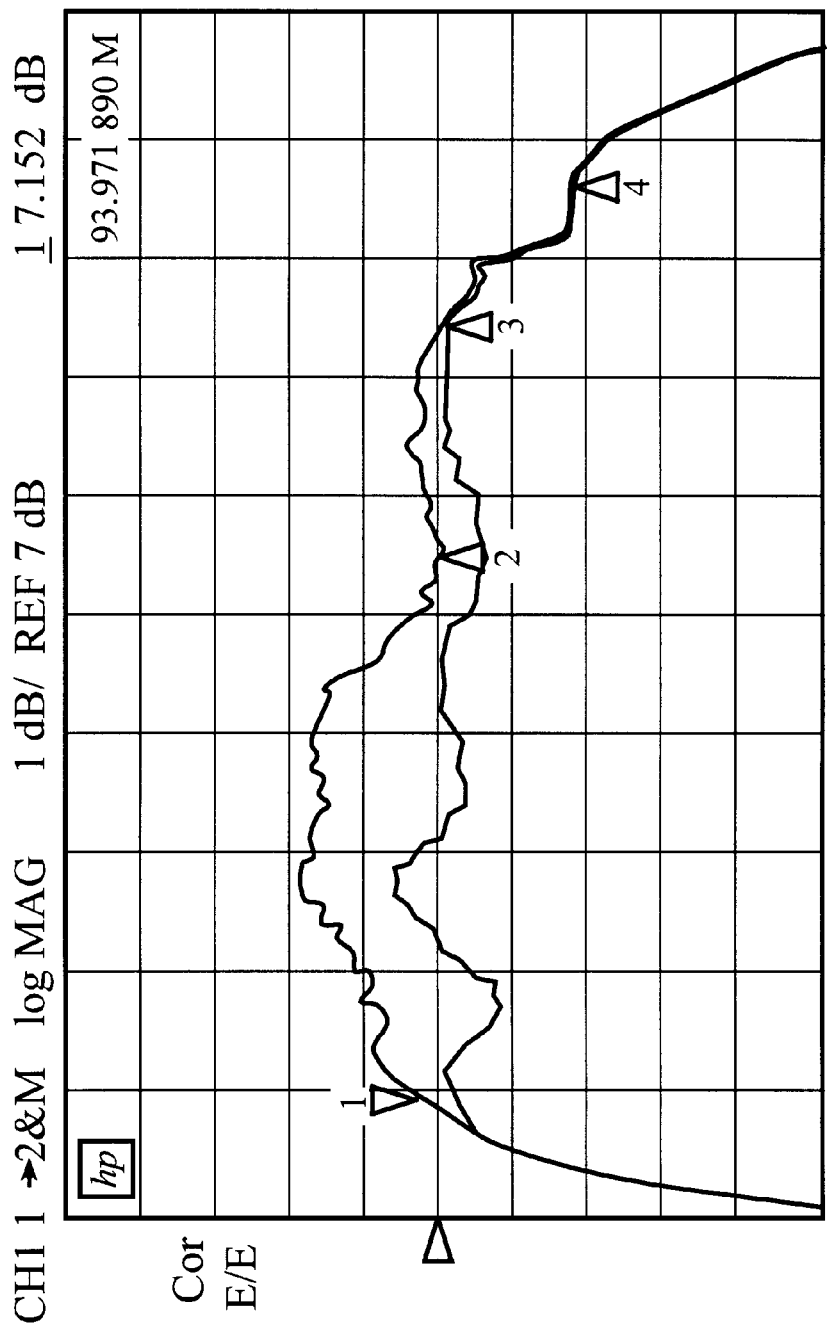
FIG. 7A shows a graphical representation of a flatness characteristic with and without the RLC impedance matching circuit, according to the present invention.
Figure 7B:
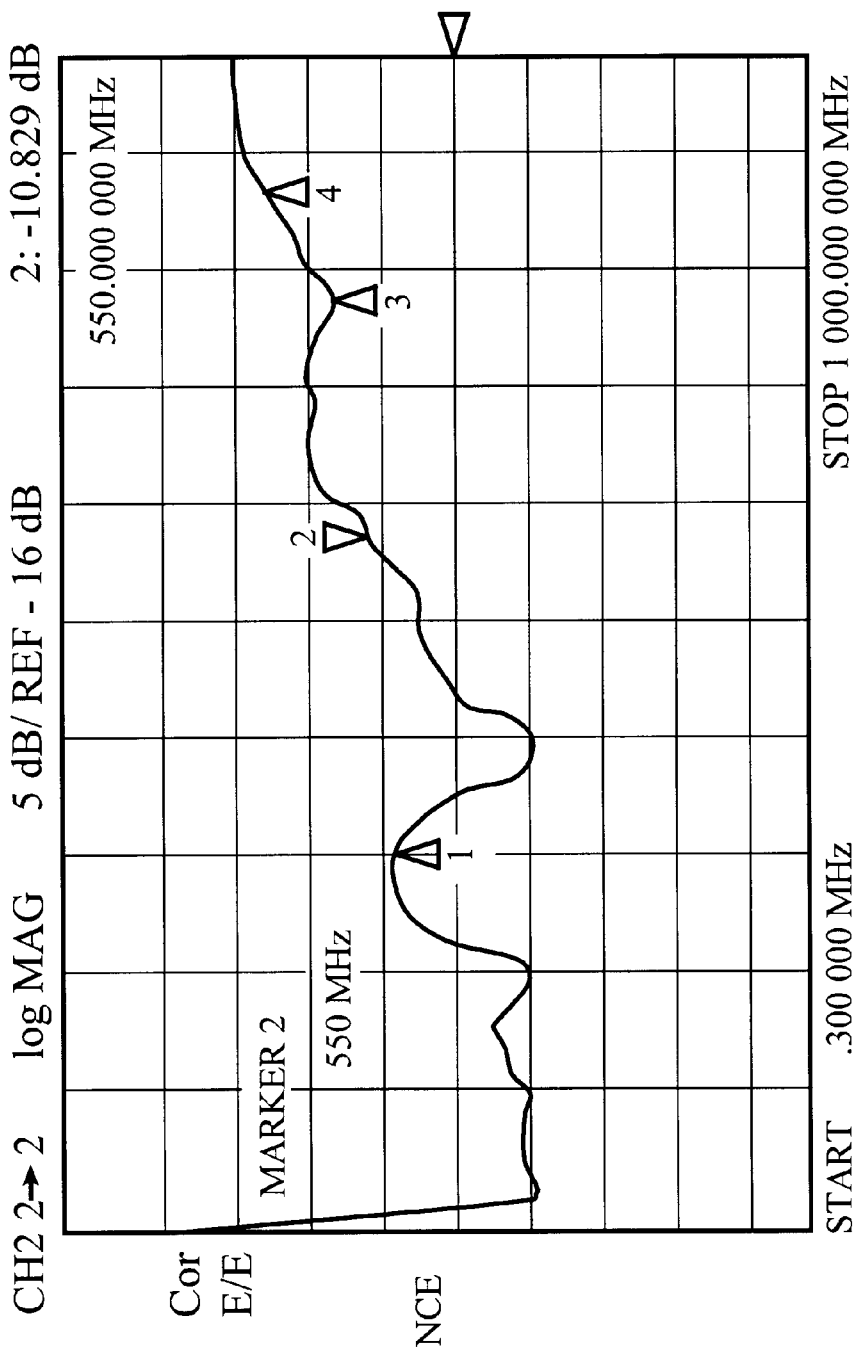
FIG. 7B shows a graphical representation of return loss characteristics of an optical receiver without a 75Ω quarter wave transmission line impedance matching circuit in accordance with the present invention.
Figure 7C:
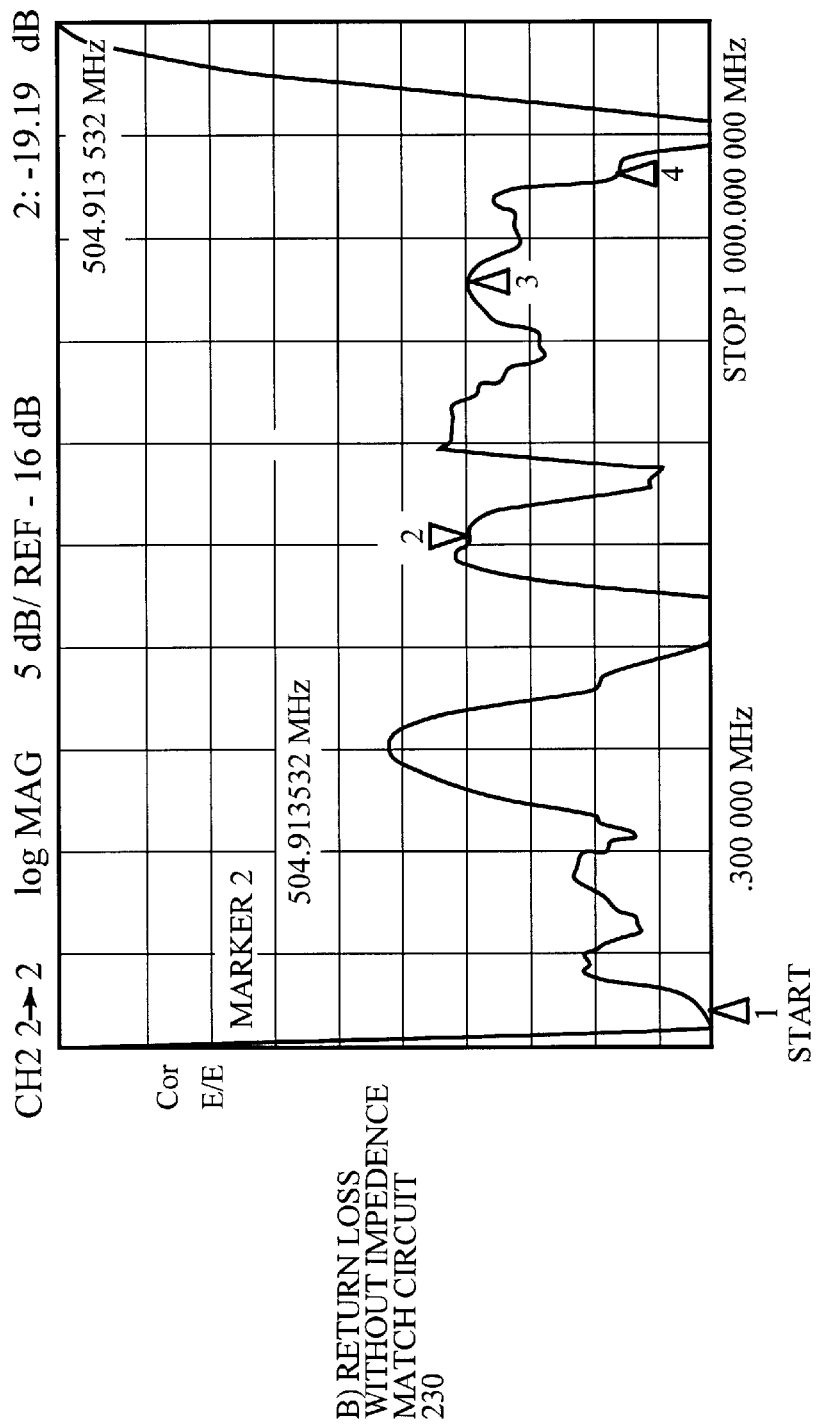
FIG. 7C shows a graphical representation of return loss characteristics of an optical receiver including a 75Ω quarter wave transmission line impedance matching circuit in accordance with the present invention.

FIG. 7A shows transmission characteristics with the impedance matching circuit 230 connected to optical receiver 150. The effect of the impedance matching circuit 230 is to pull down the amplitude of received low frequency signals for more consistent performance with less signal deviations (i.e., within ±1 dB) between the low (50 MHz) and high (750 MHz) frequencies. Similarly, in FIGS. 7B and 7C, the graphs show return loss characteristics illustrating output signal levels with or without a compensating 75Ω QUARTERWAVE transmission line in impedance matching circuit 260, at the output side of the receiver. FIGS. 7A, 7B and 7C show graphs illustrating the flatness and return loss characteristics with and without the inclusion of impedance matching circuit 260 and impedance matching circuit 230. In FIG. 7A, a graph illustrates the characteristics of flatness of frequency response of RF signals with and without the compensation of the RLC impedance matching circuit 230. The x-axis of FIG. 7A represents the frequency spectrum from 0 to 1 GHz, and the y-axis represents the signal amplitude in 1 dB increments. The upper graph illustrates the flatness characteristics of an optical receiver without an impedance matching circuit 230 in which the graph between low (50 MHz) and high (750 MHz) frequencies (at marker 3) contain amplitude deviations of greater than 2 dB.

What is claimed is:

1. A system comprising:
   a photo detector configured to receive an input optical signal having selected wave bands which carry a plurality of channels, and to convert input optical signals into corresponding electrical signals;
   a first circuit coupled to said photo detector for establishing a substantially constant power level across a selected plurality of signal channels; and
   a second circuit coupled to said first circuit for interfacing with a coaxial cable, with reduced signal return.

2. The system according to claim 1 comprising a signal processing circuit coupled between said photo detector and said first circuit, said signal processing circuit comprising a pre-amplifier circuit.

3. A system comprising:
   a photo detector configured to receive an input optical signal having selected wave bands which carry a plurality of channels, and to convert input optical signals into corresponding electrical signals;
   a first circuit coupled to said photo detector for establishing a substantially constant power level across a selected plurality of signal channels;
   a second circuit coupled to said first circuit for interfacing with a coaxial cable, with reduced signal return; and
   further comprising a signal processing circuit coupled between said photo detector and said first circuit, said signal processing circuit comprising a pre-amplifier circuit, wherein said signal processing circuit further comprises an automatic level control circuit.

4. A system comprising:
   a photo detector configured to receive an input optical signal having selected wave bands which carry a plurality of channels, and to convert input optical signals into corresponding electrical signals;
   a first circuit coupled to said photo detector for establishing a substantially constant power level across a selected plurality of signal channels;
   a second circuit coupled to said first circuit for interfacing with a coaxial cable, with reduced signal return; and
   further comprising a signal processing circuit coupled between said photo detector and said first circuit, said signal processing circuit comprising a pre-amplifier circuit, wherein said signal processing circuit further comprises a tilt circuit for adjusting amplitude change with frequency of said electrical signal.

5. A system comprising:
   a photo detector configured to receive an input optical signal having selected wave bands which carry a plurality of channels, and to convert input optical signals into corresponding electrical signals;
   a first circuit coupled to said photo detector for establishing a substantially constant power level across a selected plurality of signal channels;
   a second circuit coupled to said first circuit for interfacing with a coaxial cable, with reduced signal return; and
   further comprising a post amplifier having an input coupled to said first circuit for amplifying received electrical signals.

6. A system comprising:
   a photo detector configured to receive an input optical signal having selected wave bands which carry a plurality of channels, and to convert input optical signals into corresponding electrical signals;
   a first circuit coupled to said photo detector for establishing a substantially constant power level across a selected plurality of signal channels;
   a second circuit coupled to said first circuit for interfacing with a coaxial cable, with reduced signal return; and
   further comprising a switch having a first input port coupled to said first circuit, and a second input port coupled to an input from a coaxial cable, and an output port coupled to said second circuit for selectively receiving signals from said first input port or said second input port.

7. A system comprising:
   a photo detector configured to receive an input optical signal having selected wave bands which carry a plurality of channels, and to convert input optical signals into corresponding electrical signals;
   a first circuit coupled to said photo detector for establishing a substantially constant power level across a selected plurality of signal channels;
   a second circuit coupled to said first circuit for interfacing with a coaxial cable, with reduced signal return; and
   further comprising an output level monitor circuit having an input port coupled to said first and second circuits for receiving electrical signals, and an output port coupled to an automatic level control driver.

8. The system according to claim 7 further comprises an automatic level control driver circuit having an input coupled to said output level monitor circuit and an output coupled to said automatic level control circuit for level control.

9. An optical receiver system comprising:
   a photo detector disposed to receive an input optical signal having a plurality of channels at selected wave bands for converting said input optical signal to a corresponding electrical signal;
   a first impedance matching circuit coupled to said photo detector for maintaining a consistent power level across a plurality of channels; and
   a second impedance matching circuit coupled to said first impedance matching circuit for transmitting said electrical signals onto a coaxial cable with reduced return loss.

10. The system according to claim 9 wherein said second impedance matching circuit comprises a 75Ω quarterwave transmission line.

11. The system according to claim 9 wherein said first impedance circuit comprises a series resistor-inductor-capacitor for resonating said electrical signal.

12. The system according to claim 11 further comprising a signal processing circuit coupled between said photo detector and said first impedance matching circuit, and comprises a pre-amplifier circuit having an input coupled to an output of said photo detector for increasing the amplitude of said electrical signal.

13. An optical receiver system comprising:
- a photo detector disposed to receive an input optical signal having a plurality of channels at selected wave bands for converting said input optical signal to a corresponding electrical signal;
- a first impedance matching circuit coupled to said photo detector for maintaining a consistent power level across a plurality of channels, wherein said first impedance circuit comprises a series resistor-inductor-capacitor for resonating said electrical signal;
- a second impedance matching circuit coupled to said first impedance matching circuit for transmitting said electrical signals onto a coaxial cable with reduced return loss; and
- further comprising a signal processing circuit coupled between said photo dectector and said first impedance matching circuit, and comprises a pre-amplifier circuit having an input coupled to an output of said photo detector for increasing the amplitude of said electrical signal, wherein said signal processing circuit comprises an automatic level control circuit having an input coupled to an output of said pre-amplifier for maintaining the stability of said electrical signal by adjusting the amplitude of said electrical signal in a broad dynamic range transparent to 1310 nm and 1550 nm optical wavelengths.

14. The system according to claim 13 wherein said signal processing circuit comprises a tilt characteristic and has an input coupled to an output of said automatic level control circuit for adjusting amplitude change with frequency of said electrical signal.

15. The system according to claim 14 further comprises a post amplifier having an input coupled to said first impedance matching circuit for amplifying electrical signals.

16. The system according to claim 15 further comprising a switch having a first input port coupled to an output of said post amplifier and a second input port coupled to an input from a coaxial cable and an output port coupled to an input of said second impedance matching circuit for selecting connection with said first input port or said second input port.

17. The system according to claim 16 further comprising an output level monitor circuit having an input port coupled to said output port of said post amplifier for receiving said electrical signal from said output port of said post amplifier, and a first output port coupled to said switch for indicating to said switch whether said optical receiver is functioning properly and a second output port coupled to an automatic level control driver for controlling the amplitude of said electrical signal.

18. The system according to claim 17 further comprising an automatic level control driver circuit having an input coupled to said output level monitor circuit and an output coupled to said automatic level control circuit for supplying said electrical signal to said automatic level control circuit.

19. A method for converting an optical signal into an RF signal over a selected radio frequency spectrum with a first impedance matching circuit and a second impedance matching circuit, comprising:
- receiving an optical signal and converting said optical signal into an RF signal;
- maintaining frequency deviations of said RF signal within ±1 dB over a selected radio frequency spectrum with said first impedance matching circuit; and
- absorbing a substantial portion of any reflected signal return from with said second impedance matching circuit.

20. A circuit for transmitting radio frequency signals in a selected frequency range f1 to f2, comprising:
- a quarter wavelength connection at a selected frequency near f2, said quarter wavelength connection having first and second sides;
- an inductor having an inductance and a parasitic capacitance, connected to said first side, the inductance of said inductor being sufficiently high to prevent substantial leakage to ground; and
- a capacitor C having a selected capacitance "c", connected to said second side, said selected capacitance being sufficiently low to prevent substantial leakage to ground;

wherein $c=1/L\,(2\Pi\,f3)^2$, where c is a selected capacitance of capacitor C;

f3 is a resonant frequency greater than f2;

f2 is a frequency greater than f1; and

L is an effective inductance determined by the effect of said parasitic capacitance acting through said quarter wavelength connection.

* * * * *